United States Patent
Basu et al.

(10) Patent No.: US 9,507,689 B2
(45) Date of Patent: Nov. 29, 2016

(54) UPDATING OF TROUBLESHOOTING ASSISTANTS

(71) Applicant: International Business Machines Corporation, Armonk, NY (US)

(72) Inventors: Gaurab Basu, Howrah (IN); Praveen Jayachandran, Bangalore (IN); Deepak Kumar Jeswani, New Delhi (IN); Rohit Ranchal, West Lafayette, IN (US); Akshat Verma, New Delhi (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/488,977

(22) Filed: Sep. 17, 2014

(65) Prior Publication Data

US 2016/0077947 A1    Mar. 17, 2016

(51) Int. Cl.
G06F 11/34    (2006.01)
G06F 11/36    (2006.01)

(52) U.S. Cl.
CPC ......... *G06F 11/3476* (2013.01); *G06F 11/368* (2013.01); *G06F 11/3636* (2013.01)

(58) Field of Classification Search
CPC .............. G06F 11/079; G06F 11/0709; G06F 11/0793; G06F 8/65
See application file for complete search history.

(56) References Cited

U.S. PATENT DOCUMENTS

| | | | |
|---|---|---|---|
| 6,732,124 B1* | 5/2004 | Koseki | G06F 11/1435 |
| 7,484,130 B2 | 1/2009 | Biegert et al. | |
| 7,546,595 B1* | 6/2009 | Wickham | G06F 8/65 |
| | | | 717/168 |
| 7,877,642 B2 | 1/2011 | Ding et al. | |
| 9,189,317 B1* | 11/2015 | Marimuthu | G06F 11/0778 |
| 2004/0260678 A1 | 12/2004 | Verbowski et al. | |
| 2010/0153732 A1* | 6/2010 | Su | G06F 12/1408 |
| | | | 713/176 |
| 2014/0007050 A1* | 1/2014 | Belisario | G06F 3/04847 |
| | | | 717/113 |

OTHER PUBLICATIONS

Wang, Helen J. et al., "Automatic Misconfiguration Troubleshooting with PeerPressure", OSDI '04, Proceedings of the 6th Conference on Symposium on Operating Systems Design & Implementation, Dec. 6-8, 2004, San Francisco, CA, USA, pp. 245-257, vol. 6, USENIX Association, Berkeley, CA, USA.

* cited by examiner

*Primary Examiner* — Jigar Patel
(74) *Attorney, Agent, or Firm* — Ference & Associates LLC

(57) ABSTRACT

Methods and arrangements for providing assistance with troubleshooting for system updates. There is sent, to a first database, a feature log associated with an update event at a first location. The feature log is pooled in the first database with feature logs associated with update events at other locations. A signature is created of at least one update from the first database, and the signature is added to a signature database. The signature database is employed to identify one or more deviations, when the at least one update fails in at least one location. The one or more deviations are ranked with respect to at least one other deviation. Other variants and embodiments are broadly contemplated herein.

18 Claims, 4 Drawing Sheets

UPDATING OF TROUBLESHOOTING ASSISTANTS

BACKGROUND

System updates can generally include any of a great variety of items, such as OS patches, software installation or upgrades, and compliance actions. Often, the updating of production systems can be risky, non-deterministic and result in penalties; the updates themselves are often not understood by system administrators, and troubleshooting can involve a great deal of speculation and online reading, if not result in frequent misdiagnoses. Generally, conventional efforts have presented tremendous shortcomings in characterizing system updates and providing troubleshooting hints (or guidance) to system administrators.

BRIEF SUMMARY

In summary, one aspect of the invention provides a method of providing assistance with troubleshooting for system updates, the method comprising: utilizing at least one processor to execute computer code configured to perform the steps of: creating a feature log associated with introduction of a system update at a first location; pooling the feature log with feature logs associated with introduction of the system update at other locations; based on the pooling, creating a signature of the system update; and identifying one or more deviations from the signature when the system update fails in at least one location.

Another aspect of the invention provides an apparatus for providing assistance with troubleshooting comprising: at least one processor; and a computer readable storage medium having computer readable program code embodied therewith and executable by the at least one processor, the computer readable program code comprising: computer readable program code configured to create a feature log associated with introduction of a system update at a first location; computer readable program code configured to pool the feature log with feature logs associated with introduction of the system update at other locations; computer readable program code configured to create, based on the pooling, a signature of the system update; and computer readable program code configured to identify one or more deviations from the signature when the system update fails in at least one location.

An additional aspect of the invention provides a computer program product providing assistance with troubleshooting comprising: a computer readable storage medium having computer readable program code embodied therewith, the computer readable program code comprising: computer readable program code configured to create a feature log associated with introduction of a system update at a first location; computer readable program code configured to pool the feature log with feature logs associated with introduction of the system update at other locations; computer readable program code configured to create, based on the pooling, a signature of the system update; and computer readable program code configured to identify one or more deviations from the signature when the system update fails in at least one location.

A further aspect of the invention provides a method comprising: sending, to a first database, a feature log associated with introduction of a system update at a first server; pooling the feature log in the first database with feature logs associated with introduction of the system update at other servers; creating a signature of the system update from the first database; the creating comprising logging a time-ordered trace of accessed features of the at least one update; adding the signature to a second database different from the first database, the signature: comprising a signature tree; conveying an update execution flow; and conveying values of features contributing to different execution sequences for the update; employing the signature to identify one or more deviations, when the system update fails in at least one location; and ranking the one or more deviations with respect to at least one other deviation, based on at least one predetermined criterion.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
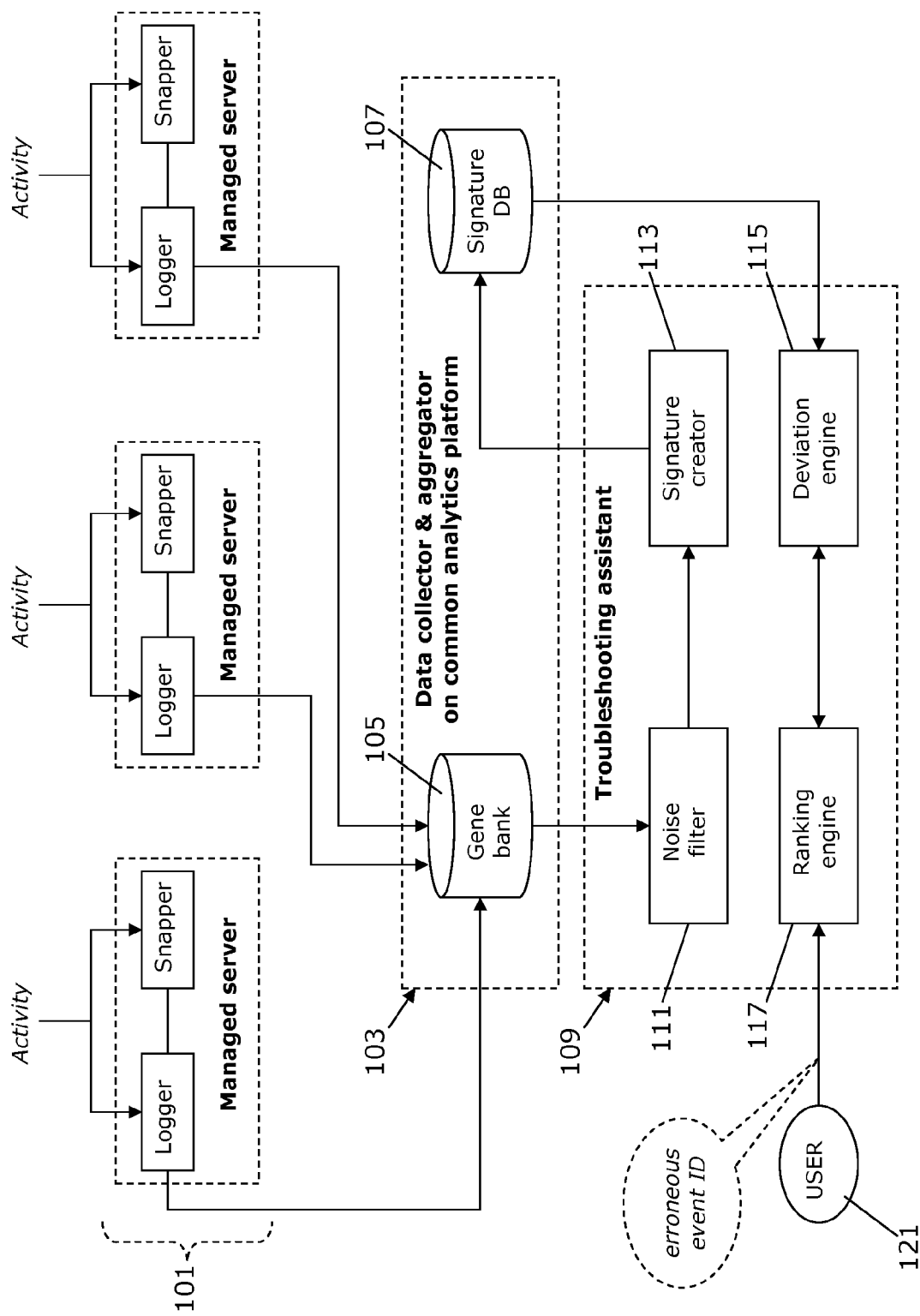
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are system and methods for identifying and ranking potential root causes for a system update failure. (In the discussion herethroughout, the terms "system update" and "update" may be considered to be interchangeable with "update event" or "event".) To this end, a logger can log a trace of all accessed features of a given update and obtain feature values from a snapshot taken before the update was run. A "gene pool" or "gene bank" of gene sequences (relating to update features) can be produced by running the update at a diverse set of locations (e.g., servers or server instances) and removing PoVs (point-of-views, e.g., IP and other addresses) from the generated logs; essentially, a "gene sequence" as understood herein relates to information on one or more identifying features of an update once introduced at one or more different locations. More particularly, as broadly contemplated herein, an agent is employed to collect features used by update activity (e.g., file content, permissions, registry entries, sequence in which they are accessed) to create a gene sequence. The gene bank is created from the collected gene sequences, and a signature tree is created to capture execution flows and dependencies of updates.

As such, in accordance with at least one embodiment of the invention, the aforementioned signature tree (e.g., as illustrated by way of example in FIG. 2) can be created from the pool of gene sequences, wherein the signature tree captures how different values for relevant features impact an execution sequence followed by the update. This tree can be used to identify deviations from a successful execution sequence, and given features can be pruned from the tree as a result. As such, given a failed invocation of an update, the signature tree can be used to identify deviations, and information across other events can be used to rank selected deviations. Deviations from successful paths are identified and ranked based on: differences with successful events; the number and sizes of clusters of successful events; and whether or not a feature was present in the event and in a trace log. Such deviations can be determined, e.g., by comparing a path of a failed update, whether encountered previously or in a subsequent event, against the created signature tree.

FIG. 1 schematically illustrates a system architecture, in accordance with at least one embodiment of the invention. For each of a plurality of servers 101, a logger logs all system activity performed by an update (relative to the individual server), in time-ordered fashion. A snapper also snapshots the system periodically, by way of capturing a status of the system and any of a number of relevant aspects related to system features, e.g., feature content and metadata. Such information (e.g., feature content and metadata) is collected for discriminant files from a snapshot determined to be most appropriate, wherein the discriminant files can be provided by an expert or on a basis of prior knowledge of the update.

In accordance with at least one embodiment of the invention, ordered logs are accepted from system loggers at a data collector/aggregator on a common analytics platform (103). These ordered logs are cleaned to create a gene sequence corresponding to an event from a server. One type of cleaning in this context can involve the masking of environmental parameters such as IP addresses; this will then allow a feature to be compared across different events by way of helping determine equivalence. The update is run on a set of diverse locations (e.g., servers or server instances) and all the gene sequences (from the locations) are collected to create a gene bank 105. A signature database 107 is also provided on that platform, whose function will be better appreciated herebelow. While the gene bank 105 and signature database 107 are primarily discussed and contemplated herein as two separate databases or storage areas, in accordance with a variant embodiment they can be coincident with one another as part of the same database or storage area.

In accordance with at least one embodiment of the invention, a troubleshooting assistant 109 includes a noise filter 111 which feeds into a signature creator 113. The signature creator 113 is configured to identify features, which determine an execution flow for the update, i.e., the objective is to identify features such that different values for the feature content or metadata can lead to the update taking different execution paths. In this step, the noise filter 111 can serve to remove additional noise from feature data relating to an update. The signature creator 113, for its part, creates a sequence of dependencies and conflicts for the activity; this sequence can be referred to as a "signature". The signature then is pruned by eliminating transitions that do not lead to branching or are not discriminant features. The resulting (pruned) signature then goes to the signature database 107 for storage. An illustrative and non-restrictive example of a signature, in the form of a signature tree 219, is shown in FIG. 2.

In accordance with at least one embodiment of the invention, a deviation engine 115 takes the gene sequence of a failed event and compares the same with the signature to identify all features, whose deviations from predetermined "good" or acceptable values may lead to a failed path for the activity. If new paths are found by new events (e.g., at new locations), these deviations are also encoded into the signature, and this modified signature is then stored in the signature database 107. In communication with the deviation engine 115 is a ranking engine 117 which ranks all deviations/features based on: the number of successful/unsuccessful events that are similar to an event with respect to an element under consideration; the number of successful/unsuccessful events that are similar to one another with respect to this feature; and, with respect to files or registry elements, whether the feature is present on the failed event and/or logged in its gene sequence, and the number of times it is read or written. Different weights can be assigned to each of these factors in developing a (suitable, predetermined) formula used for the actual ranking. By way of illustrating the utility of a ranking engine, a user 121 may input an identifier (e.g., a predetermined number or term) for an erroneous event and may view its ranking relative to one or more other events.

In accordance with at least one embodiment of the invention, it can generally be appreciated that system updates are different from application configurations, in that any content in any file or registry across an entire system can lead to a failing update. To deal with data sets of a size typically involved here can be very challenging, and conventional approaches usually depend on an expert-collated small set of configuration files; such an approach often fails in troubleshooting system updates. In contrast, a system as broadly contemplated herein uses system-level logging in combination with snapshots to identify all file/registry entries that impact the activity and builds a cause-effect signature tree or Finite State Machine (FSM), which captures an accurate profile of the update activity. As such, there is broadly contemplated herein the use of intelligent merging and pruning steps to eliminate noise and drastically reduce a very large data set into an FSM of practical size, and then rank relevant features based on cross-VM (virtual machine) clustering and outlier detection.

Figure 2:
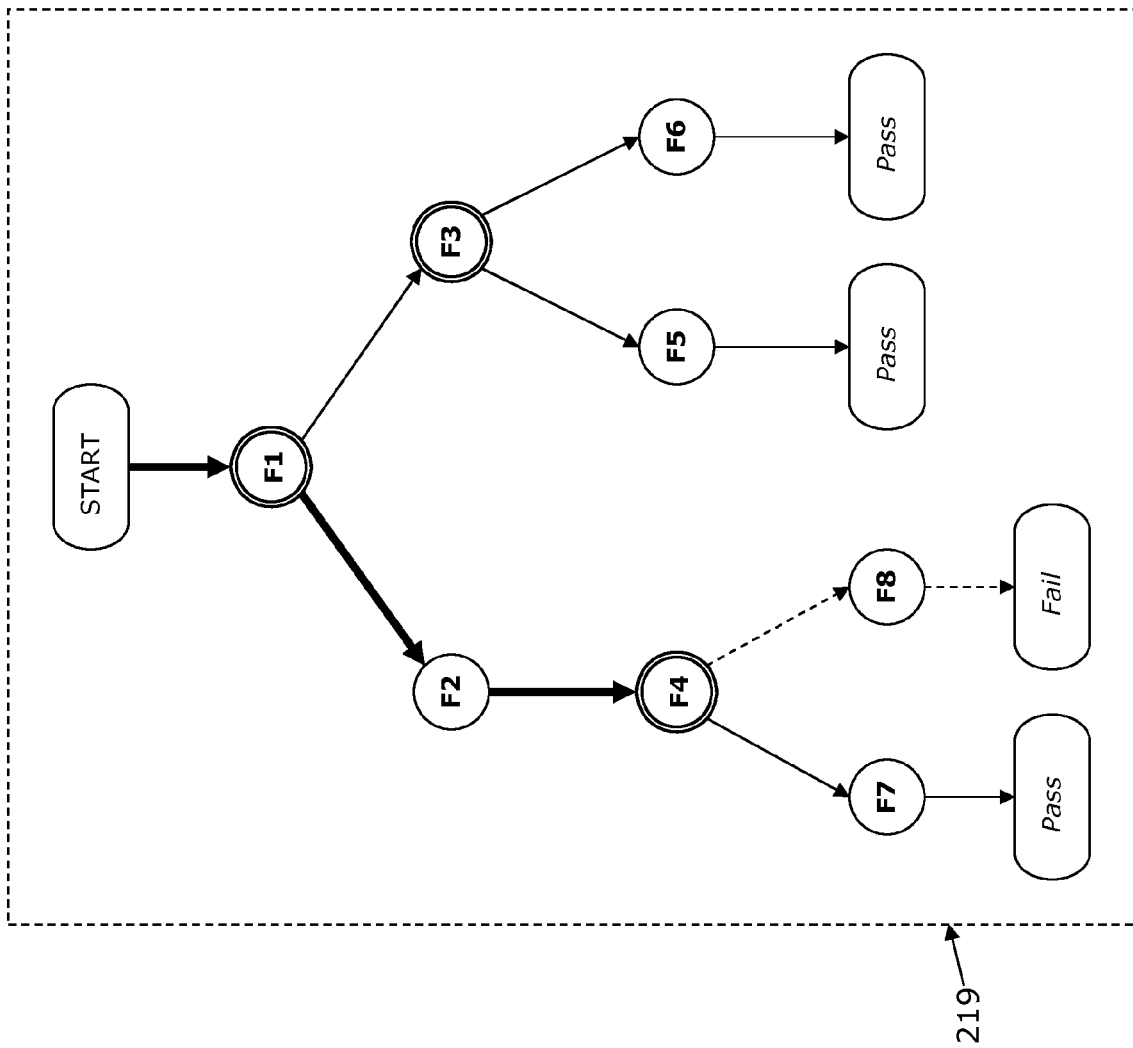
FIG. 2 illustrates an example signature tree.
Figure 2:
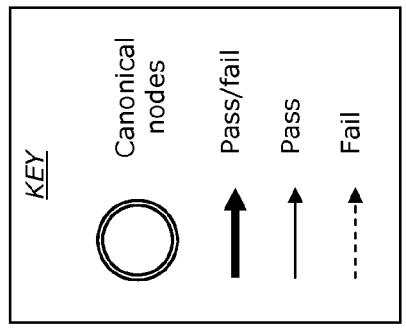

Any of a very wide variety of algorithms may be employed for forming a signature tree in accordance with at least one embodiment of the invention (e.g., such as indicated at 219 in FIG. 2). A key step in creating a signature tree can involve finding overlap between different (input) gene sequences, and merge across such sequences those features which are accessed by the update after following the same execution sequence. Thus, a central step here is to find equivalent features across different gene sequences.

By way of an illustrative and non-restrictive example, in accordance with at least one embodiment of the invention, a (K,D)-approximate tail may be employed. Here, two features are (K,D) approximate if the k trailing features for the first feature in its gene sequence is covered by (K+D) trailing features of the second feature in its gene sequence (and vice versa). There may also be employed a P-common predecessor, wherein two nodes are regarded as P-common predecessors if one of their P-ancestors are common (not necessarily at the same level). It can thus be appreciated that the first criterion here ((K,D)-approximate tail) ensures that update activity follows the same path after accessing the feature being evaluated on the different locations, while the second criterion (P-common predecessor) ensures that activity had followed the same path before accessing the feature being evaluated. Features can then be merged if they have a P-common predecessor and: have either the same marker (content and metadata); or are (K,D)-approximate tail equivalent. A signature tree can include information about failed and successful paths or states, and can be created online as new traces are generated. Analyzing a new trace then requires only the signature tree to be loaded, as opposed to any and all previously seen traces.

As alluded to above, it should be appreciated, in accordance with at least one embodiment of the invention, that an advantage of separate (and separately functioning) components in the form of a gene bank and a signature database (indicated at 105 and 107 in FIG. 1, respectively) may be found in that the latter can be kept to a smaller and more manageable size, placing less demands on system resources, while the former can be relatively large while serving in a role of accepting large streams of data and storing considerable amounts thereof before propagating data forward for signature creation.

Generally, in accordance with at least one embodiment of the invention, there are several conceivable settings for systems and methods for providing a troubleshooting assistant, as broadly contemplated herein. By way of an illustrative and non-restrictive example, a troubleshooting assistant can be provided with respect to system updates performed on virtual machines in a cloud, e.g., server instances, especially in a context of migrating virtual machines to a cloud. However, it should be appreciated that this represents but one example among a very wide variety of possible applications.

In accordance with at least one embodiment of the invention, quantitative scores and values as determined herein can be stored in memory or displayed to a user on a screen, as might fit the needs of one or more users. This may include, e.g., one or more rankings of deviations as broadly discussed and contemplated herein.

Figure 3:
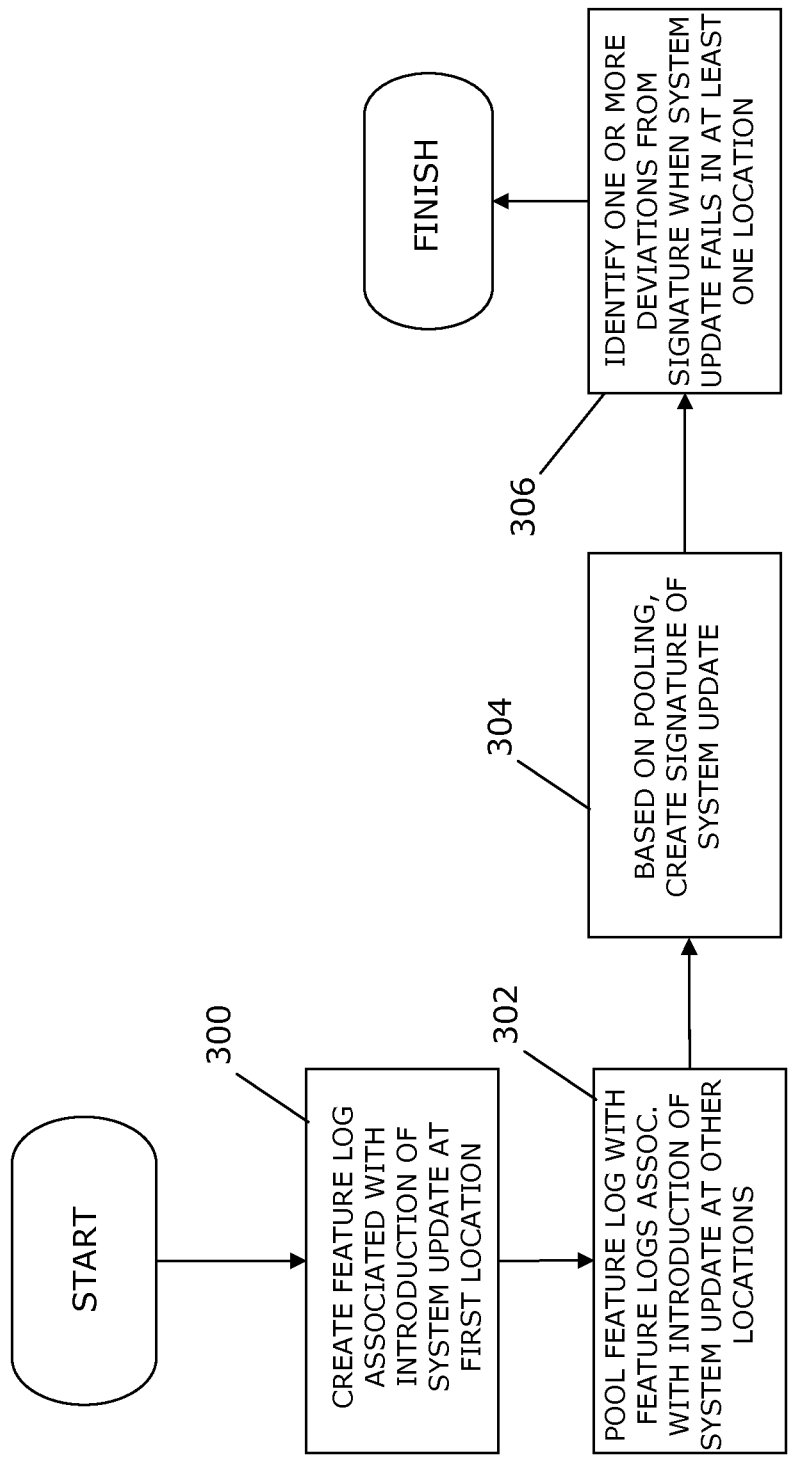
FIG. 3 sets forth a process more generally for updating a troubleshooting assistant.

FIG. 3 sets forth a process more generally for providing assistance with troubleshooting for system updates, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a feature log, associated with introduction of a system update at a first location, is created (300). The feature log is pooled with feature logs associated with introduction of the system update at other locations (302). Based on the pooling, a signature is created of the system update (304) and one or more deviations from the signature are identified when the system update fails in at least one location (306).

Figure 4:
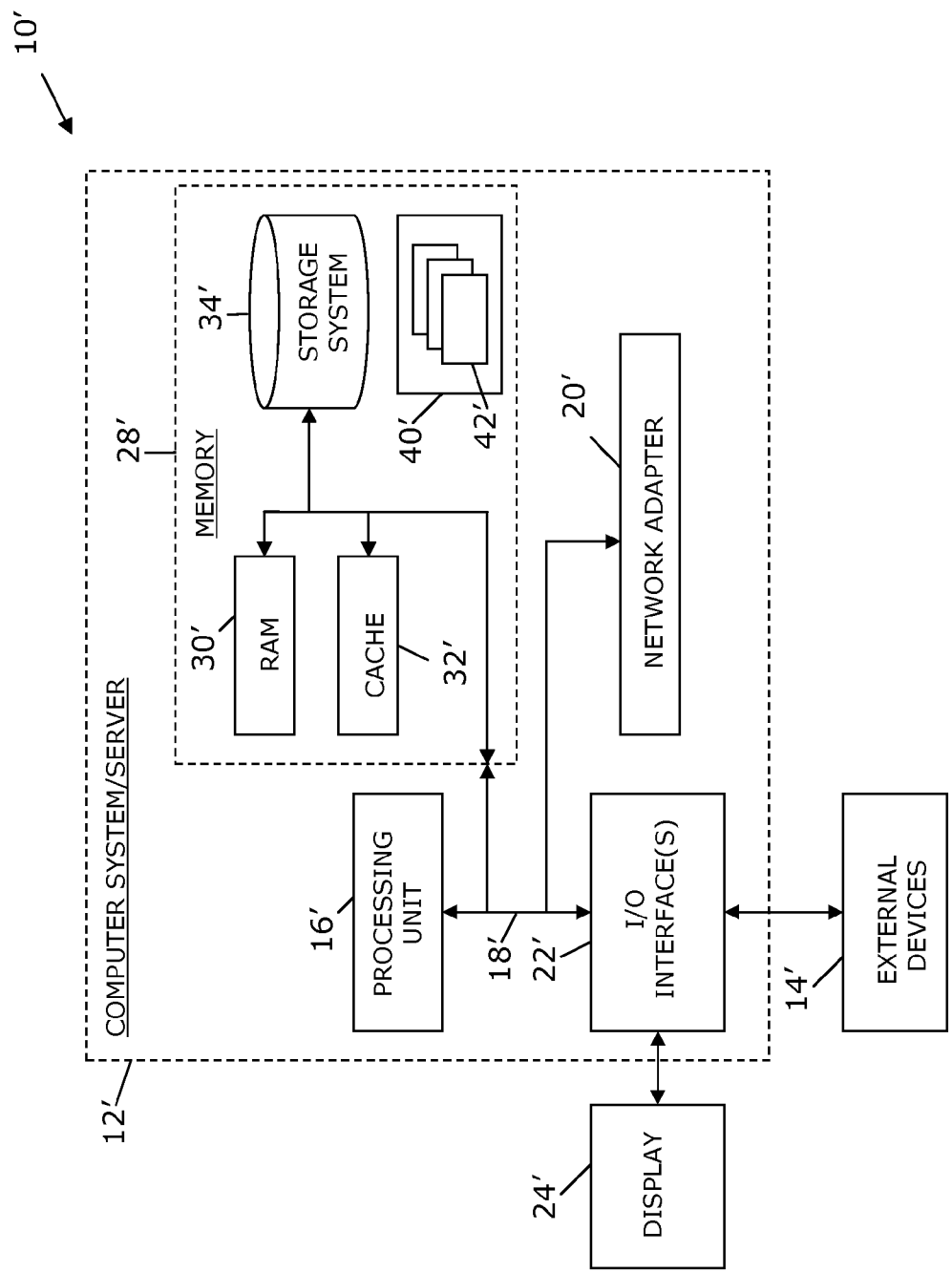
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited took, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing assistance with troubleshooting for system updates, the method comprising:
    utilizing at least one processor to execute computer code configured to perform the steps of:
    creating a feature log associated with introduction of a system update at a first location;
    pooling the feature log with feature logs associated with introduction of the system update at other locations;
    based on said pooling, creating a signature of the system update wherein the signature conveys values of features contributing to different execution sequences for the system update, and wherein the creating comprises identifying features across trace logs from different locations where an update follows the same execution sequence before accessing a feature; and
    identifying one or more deviations from the signature when the system update fails in at least one location.

2. The method according to claim 1, wherein said creating a signature comprises logging a time-ordered trace of accessed features of the at least one update.

3. The method according to claim 2, wherein said logging comprises obtaining at least one system snapshot to obtain content and metadata of features accessed by at least one update.

4. The method according to claim 1, comprising ranking the one or more deviations with respect to at least one other deviation, based on at least one predetermined criterion.

5. The method according to claim 4, wherein the at least one predetermined criterion comprises at least one of: successful update events, number and sizes of clusters of successful update events, whether a feature was present in an update event, and whether a feature was present in a trace log.

6. The method according to claim 1, wherein the signature comprises a signature tree.

7. The method according to claim 1, wherein the signature conveys an update execution flow.

8. The method according to claim 1, wherein the signature marks the identified features as equivalent.

9. The method according to claim 1, wherein the signature identifies features across various trace logs from various events where an update follows differing execution sequences after accessing a feature, depending on the value of the feature.

10. The method according to claim 9, wherein the signature captures feature values that contribute to differing execution sequences.

11. The method according to claim 1, wherein an equivalence of features is determined on the basis of at least one of:

content and metadata of features, a fixed number of features accessed before a feature, and a finite number of features accessed after a feature.

12. The method according to claim 1, wherein an equivalence of features is determined iteratively for all features present across all trace logs in the first database.

13. The method according to claim 1, wherein:
at least one server is located at the first location; and
other servers are located at other locations.

14. The method according to claim 1, wherein:
at least one virtual server instance is located at the first location; and
other virtual server instances are located at other locations.

15. The method according to claim 1, wherein:
said pooling is performed at a first database; and
said creating a signature comprises storing the signature in a second database different from the first database.

16. An apparatus for providing assistance with troubleshooting comprising:
at least one processor; and
a computer readable storage medium having computer readable program code embodied therewith and executable by the at least one processor, the computer readable program code comprising:
computer readable program code configured to create a feature log associated with introduction of a system update at a first location;
computer readable program code configured to pool the feature log with feature logs associated with introduction of the system update at other locations;
computer readable program code configured to create, based on said pooling, a signature of the system update wherein the signature conveys values of features contributing to different execution sequences for the system update, and wherein the creating comprises identifying features across trace logs from different locations where an update follows the same execution sequence before accessing a feature; and
computer readable program code configured to identify one or more deviations from the signature when the system update fails in at least one location.

17. A computer program product for providing assistance with troubleshooting comprising:
at least one processor; and
a computer readable storage medium having computer readable program code embodied therewith and executable by the at least one processor, the computer readable program code comprising:
computer readable program code configured to create a feature log associated with introduction of a system update at a first location;
computer readable program code configured to pool the feature log with feature logs associated with introduction of the system update at other locations;
computer readable program code configured to create, based on said pooling, a signature of the system update wherein the signature conveys values of features contributing to different execution sequences for the system update, and wherein the creating comprises identifying features across trace logs from different locations where an update follows the same execution sequence before accessing a feature; and
computer readable program code configured to identify one or more deviations from the signature when the system update fails in at least one location.

18. A method comprising:
sending, to a first database, a feature log associated with introduction of a system update at a first server;
pooling the feature log in the first database with feature logs associated with introduction of the system update at other servers;
creating a signature of the system update from the first database;
said creating comprising logging a time-ordered trace of accessed features of the at least one update;
adding the signature to a second database different from the first database, the signature:
comprising a signature tree;
conveying an update execution flow; and
conveying values of features contributing to different execution sequences for the update;
employing the signature to identify one or more deviations, when the system update fails in at least one location; and
ranking the one or more deviations with respect to at least one other deviation, based on at least one predetermined criterion.

* * * * *